Figure 3:
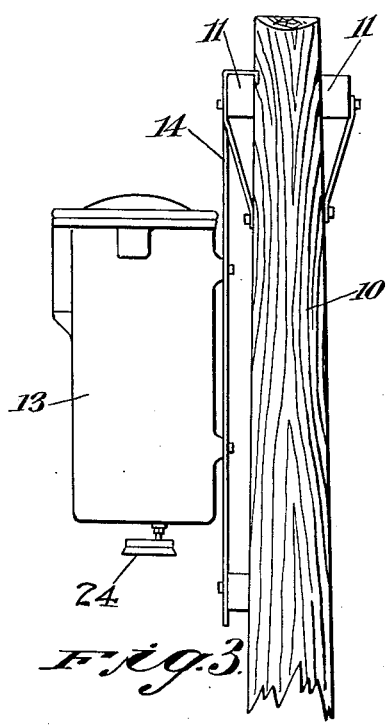

Dec. 30, 1930. H. SCHLAICH 1,787,327
TEMPERATURE INDICATOR FOR TRANSFORMERS AND THE LIKE
Filed Feb. 9, 1923 2 Sheets-Sheet 1
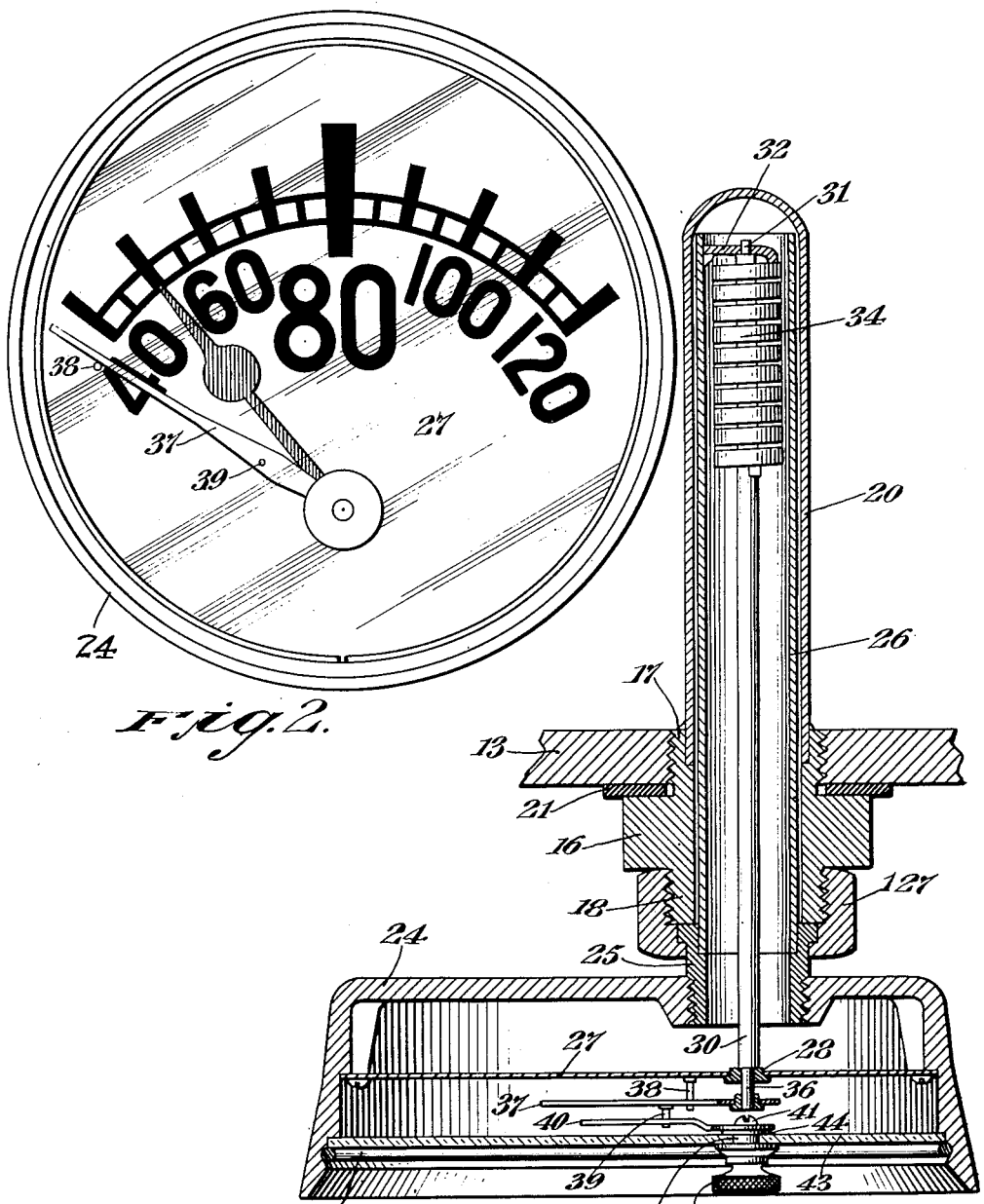
INVENTOR
Herman Schlaich
BY
His ATTORNEYS Dec. 30, 1930. H. SCHLAICH 1,787,327
TEMPERATURE INDICATOR FOR TRANSFORMERS AND THE LIKE
Filed Feb. 9, 1923 2 Sheets-Sheet 2

INVENTOR
Herman Schlaich
BY
His ATTORNEYS

Patented Dec. 30, 1930

1,787,327

UNITED STATES PATENT OFFICE

HERMAN SCHLAICH, OF LONG ISLAND CITY, NEW YORK

TEMPERATURE INDICATOR FOR TRANSFORMERS AND THE LIKE

Application filed February 9, 1923. Serial No. 618,159.

In connection with the distribution of alternating current, for power and light purposes, it is the custom to use transformers for decreasing or increasing to the desired value the voltage of the supplied current. Such transformers are ordinarily of the type characterized by the facts that the transformer coils and core are located within a casing which is filled with oil for insulating purposes. These transformers are ordinarily located at a considerable height above the ground, usually on a pole near the premises to which the current is supplied.

It is the custom to determine the size of the transformer to be used in connection with a given installation by the probable demands of the installation for current, such demands being usually estimated from data purporting to describe the current consuming devices which it is expected will be used upon the premises. It may and often does happen, however, that the current actually used upon the premises materially exceeds, or is less than the current for which the transformer was chosen at the time the installation was made. When this condition occurs, the transformer is either over-loaded or under-loaded, which means that either a larger transformer should be installed, or a smaller transformer could perhaps economically be substituted.

Inasmuch as the temperature within the transformer case is a fairly accurate indication of the current which it is required to furnish, it has occurred to me that the overloading or under-loading of the transformer may be ascertained by providing it with an instrument for indicating the temperature, and particularly the maximum temperature, of the transformer. Moreover, I have conceived the idea of so making and locating the indicating portion of the temperature indicator that it is readily readible from the ground, even when the transformer is located at a considerable height above the ground.

By providing such an instrument in combination with a transformer, periodic observations of the temperature, or the maximum temperature of the transformer are possible, with the result that any needed or desirable changes in the size of the transformer may be considered.

The present invention may be regarded as an improvement upon an invention described and claimed in my co-pending application Serial No. 618,158, filed Feb. 9, 1923; and its general object is to provide, in combination with an electrical transformer or other device adapted to be mounted at a considerable height above the ground, an improved form of temperature indicating instrument adapted to be mounted on and combined with a transformer casing in a simple and efficient manner, and with the indicating portion of the instrument so located that it is easily readable from the ground.

Figure 4:
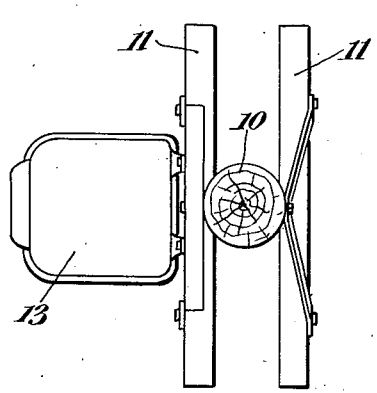
Figure 5:
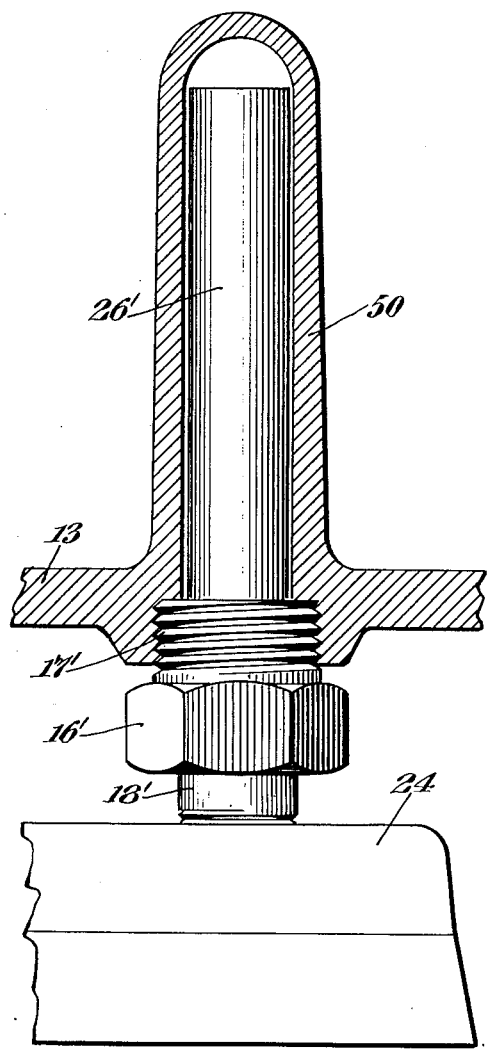

The invention will be understood from the following description taken in connection with the accompanying drawings in which is shown one form in which the invention may be embodied. In the drawings, Fig. 1 is a sectional elevation of a portion of a casing of an electrical transformer or other device provided with a temperature indicating instrument in accordance with my invention; Fig. 2 is a plan view of the indicating portion of the instrument; Fig. 3 and Fig. 4 are an elevation and a plan view of an electrical transformer mounted on a pole and provided with a temperature indicating instrument according to my invention; and Fig. 5 is an elevation, partly in section, showing a modified form of the invention.

In Figs. 3 and 4 of the invention there is shown the top portion of a pole 10 having cross arms 11 from one of which is hung an electrical transformer 13, which is bolted to a strap 14 attached to the cross arms 11 and to the pole 10 by lag screws in a conventional manner. The transformer 13 is shown as of a well known type; and it will be understood that its casing contains the coils and core of the transformer, and that the space part unoccupied by the latter is nearly filled with oil. As shown in Fig. 3, the transformer 13 has secured to its bottom a temperature indicating instrument of the kind shown in Figs. 1 and 2 or in Fig. 5, the construction of which will now be described.

Referring first to Figs. 1 and 2, the transformer 13 is provided preferably in its bottom with a threaded hole into which may be screwed a bushing 16 the middle portion of which is adapted to receive a wrench and the ends 17 and 18 of which are threaded as shown. The threaded end 17 of the bushing, which is adapted to screw into the casing of the transformer 13, has secured to it by brazing or in any other suitable manner, a tube 20 having a closed end. This tube 20 and the bushing 16 together form what may be called a well extending into the transformer casing. Access to this well may be had from without the casing, and it is into this well that the temperature responsive element of the temperature indicating instrument is inserted. A gasket 21, inserted between the centre portion of the bushing 16 and the bottom of the transformer casing, serves to make a tight joint between the casing and the bushing and thus insure that no oil is allowed to leak from the latter. It will be understood that the bushing 16 carrying the tube 20 is inserted in the transformer casing before the latter is filled with oil.

It is obvious that the temperature indicating instrument may be of many forms, but the form shown in Figs. 1 and 2 is believed to be particularly well adapted for use in carrying out the present invention, and this form will now be described in detail. What may be considered the frame of the temperature indicating instrument comprises a cup-shaped casing 24 having an opening in its back into which is screwed a bushing 25 to which is rigidly attached sleeve 26. The bushing 25 is provided with a flange at its outer end adapted to cooperate with a nut 127 which is adapted to screw on to the threaded end 18 of the bushing 16. The temperature indicating instrument is thus rigidly but removably secured to the bushing 16. Secured within the casing 24 is a plate 27 which serves both as a dial plate and to support a bushing 28 which acts as a bearing for a spindle 30 which extends upwardly in the shell 26 and is journaled at its upper end 31 in a bracket 32 secured in any suitable manner to the upper end of the inside of shell 26.

Near its upper end, the spindle 30 is surrounded by a bi-metallic coil 34, which at its upper end is secured to the bracket 32 and at its lower end is secured to the spindle 30. In a well known manner, the coil 34 serves as the temperature responsive element of the temperature indicating instrument, and causes rotation of the spindle 30 in response to varying temperatures to which the coil 34 may be subjected. At its lower end 36, the spindle 30 is provided with a pointer or hand 37, which is rigidly secured to the spindle and moves over the scale on the dial plate 27. A stop 38, projecting from the dial plate 27 serves to limit the movement of the pointer 37 in the direction corresponding to lower temperatures. The pointer 37 is provided with an outwardly extending pin 39 adapted to engage another pointer 40 which also travels over the scale on the dial plate. This pointer 40 is rigidly secured by a screw 41 to a spindle 42 rotatably mounted in the crystal 43 and frictionally held in any position to which it may be adjusted. By reason of the fact that the crystal 43 is engaged on its inner side by a spring washer 44 interposed between the hub of the pointer 40 and the crystal, and the fact that the crystal 43 is engaged on its outer surface by a flange on a knurled nut 45, secured to the spindle 42, it will be understood that the friction between the spindle 42 and the crystal 43 is sufficient so that the pointer 40 will be retained in any position to which it may be turned either by being engaged by the pin 39, or by being turned manually by means of the knurled nut 45. The crystal 43 may be held in the casing 24 in any suitable manner, as by means of a spring ring 47 which enters a groove in the casing 24 and holds the crystal against a shoulder within the latter. The instrument may be calibrated preferably before it is attached to a transformer, by rotating the nut 25 and the shell 26 with reference to the casing 24, which results in changing the angular position of the bracket 32, and the spindle and pointer 37, with reference to the scale of the instrument.

It will be obvious that the bi-metallic coil 34 is located within the transformer in a position which will insure that said coil is substantially at the temperature within the transformer. As the temperature within the transformer rises and falls, the movements of the coil 34 will cause rotation of the spindle 30 and consequent movement of the pointer 37 over the scale on the dial plate. In its movement in the direction corresponding to the higher temperatures, the pointer 37, by means of the pin 39 will move the pointer 40, so that the latter will always indicate the highest temperature reached by the pointer 37. The instrument will thus reveal not only the temperature within the transformer at the time an observation is taken, but also the maximum temperature which the transformer has reached since the pointer 40 was last set at a position corresponding to the position of the pointer 37 at the time of setting. By thus taking periodic readings from the indicating instrument, it is possible to keep informed as to the temperature which the transformer reaches; and, in this way, to obtain an indication of the maximum amount of the current demanded by any particular installation.

In the form of the invention shown in Fig. 5, the well which receives the temperature responsive element of the temperature indicating instrument is made integral with the casing of the transformer 13 by casting as a part of the latter an inwardly projecting tube 50 having a closed end. This makes it possible to considerably simplify the connection between the casing 24 of the indicating portion of the instrument and the shell 26' within which the temperature responsive element is arranged; and, as shown, the connection comprises a bushing 16' having a threaded end 17' adapted to screw into the mouth of the well in the transformer casing, and a threaded end 18' adapted to screw into the casing 24, the middle portion 16' of the bushing being adapted to receive a wrench. All the other parts of the indicating instrument shown in Fig. 5, may be the same as the parts hereinbefore described in connection with Figs. 1 and 2. The calibration of the instrument shown in Fig. 5 may obviously be effected by rotating the bushing carrying the shell 26' with reference to the casing 24.

It will be noted that, in accordance with the present invention, the indicating portion of the temperature indicating instrument is located adjacent to the bottom of the transformer where it can be readily observed from the ground and where it is to a considerable extent protected from the weather and from possible damage by linemen working on the pole.

While I have shown certain constructions in which my present invention may be embodied, it is to be understood that these are merely illustrative and that I intend in the appended claims to cover all equivalent structures which come within the spirit of the invention.

What I claim is:

1. The combination of an electrical device adapted to be located at a considerable height above the ground and having a liquid containing casing provided in its bottom with a well, access to which may be had from without the casing, and a temperature indicating instrument attached to the bottom of said casing and positioned directly beneath and close to it, and having a temperature responsive operating element extending into said well for operating the instrument oppositely in response to rise and fall of temperature, a temperature indicating member located on the outside of and supported by the said casing in a position to be readable from the ground, means connecting said member to said element for operation by said element, and a housing for the member including a substantially horizontal bottom cover glass through which the indicating member can be seen from the ground and a protective flange or skirt surrounding the bottom cover glass and extending substantially below it; said instrument being separable as a unit from the casing and well.

2. In an instrument of the kind described, in combination, an indicator member, a freely rotatable shaft supporting the indicator member, a thermostatic actuating coil connected at one end to said shaft, a sleeve surrounding said coil, said sleeve being open adjacent the other end of the coil, and means connecting said other end of the coil to the sleeve in proximity to the open end of the sleeve and forming a bearing for the shaft.

In testimony whereof I have affixed my signature to this specification.

HERMAN SCHLAICH.